July 14, 1964

J. A. HERBST 3,140,902

HYDRAULIC ACTUATOR SHAFT, BEARING AND SEAL

Original Filed June 17, 1958

INVENTOR.
John A. Herbst
BY

July 14, 1964   J. A. HERBST   3,140,902
HYDRAULIC ACTUATOR SHAFT, BEARING AND SEAL
Original Filed June 17, 1958   2 Sheets-Sheet 2

INVENTOR.
John A. Herbst
BY Philip G. Hilbert 3,140,902
HYDRAULIC ACTUATOR SHAFT, BEARING AND SEAL
John A. Herbst, Lake Valhalla, Montville, N.J.
(52 Iowa Ave., Paterson, N.J.)
Original application June 17, 1958, Ser. No. 742,671. Divided and this application Apr. 24, 1961, Ser. No. 124,246
3 Claims. (Cl. 308—36.1)

This invention relates to hydraulic actuating devices.

Hydraulic actuators comprise essentially coaxially related stator and rotor members; with radial vanes on each to provide chambers for receiving a hydraulic medium operative to turn the rotor member in either direction.

The vanes on both stator and rotor members are provided with seals to minimize leakage of the hydraulic medium from the high to the low pressure sides of the chambers, particularly in terms of the high pressures encountered in such devices. However, with conventional seals, the leakage is of an order which materially reduces the optimum operating efficiency of the device and results in a fairly large breakaway torque.

Accordingly, an object of this invention is to provide in hydraulic actuators, improved high pressure seals having a novel structure and manner of installation, which results in a material decrease in leakage of the hydraulic medium and a substantial reduction in the breakaway torque characteristic of the device.

In conventional seal arrangements for hydraulic actuators and motors, the longitudinal seals on the vanes of the stator and rotor members have a sliding, rubbing engagement with opposed surface portions, as said members are assembled. Apparently, this initial frictional, rubbing action may have an adverse effect on the sealing characteristics of such seals, which may account for the limited efficiency thereof.

In accordance with the instant invention, any longitudinal rubbing or frictional engagement of the vane seals is avoided by initially positioning the seals in the longitudinal grooves of the vanes in radially depressed relation to the vane edges; assembling the rotor and stator members; and after such assembly, moving the seals radially outward of their grooves into uniform, compressed sealing relation with opposed surface portions.

Furthermore, in accordance with the invention, improved seal constructions are provided for disposition between the end plates of the stator and the opposed edge portions of the stator and rotor vanes, to thereby materially reduce leakage at the ends of the actuator and to leave such end seals unimpaired and in optimum operating condition, after the end plates are tightly secured in place.

This application is a division of copending application Ser. No. 742,671, filed June 17, 1958, now Patent No. 2,030,934.

Other objects of this invention will in part be obvious and in part hereinafter pointed out.

Figure 1:
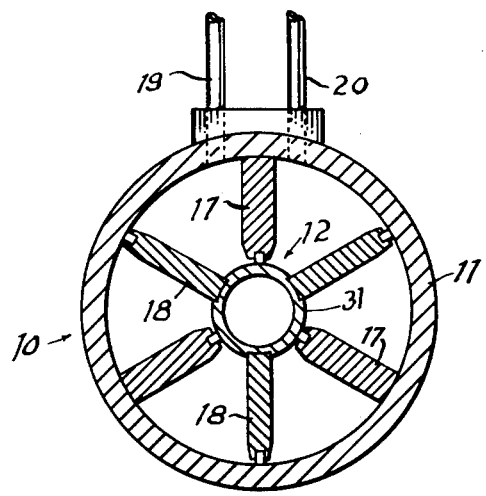
FIG. 1 is a transverse sectional view of a hydraulic actuator provided with seals embodying the invention.

Referring in detail to the drawings, 10 designates a hydraulic actuator embodying the invention; the same comprising a cylindrical stator member 11 and a coaxial rotor member 12 rotatably mounted therein. The opposite ends of stator 11 are closed by end plates 13, 14 which have central bearing openings for passing the projecting end shaft portions 15, 16 of rotor 12.

The stator member 11 is provided with the usual radially extending vanes 17; shown as three in number for the purpose of illustration and disposed at 120° intervals. Rotor member 12 is also provided with three radially extending vanes 18 at uniform angular intervals. As indicated in FIG. 1, vanes 18 are respectively located between vanes 17 to form chambers therebetween.

On stator member 11 there are inlets 19, 20 for selective admission of the hydraulic medium, which may be oil, gas or water, for effecting rotation of rotor member 12 in one direction or the other, in accordance with the routing of the hydraulic medium. The end plates 13, 14 are formed with annular distribution channels 21 and passages 22 connecting correlated chambers on either side of stator vanes 17. Thus, hydraulic medium admitted by way of inlet 19 is distributed to the three successive chambers on one side of the stator vanes; while medium admitted by way of inlet 20 is distributed to the three successive chambers on the other side of said stator vanes, all in a manner known in the art.

Inasmuch as such hydraulic medium is admitted to the several chambers of the stator member under high pressure, by pump and valve means, not shown, the radial edges of the several vanes 17, 18 must carry sealing means to minimize the leakage of hydraulic medium from the high pressure to the low pressure sides of said chambers.

Figure 2:
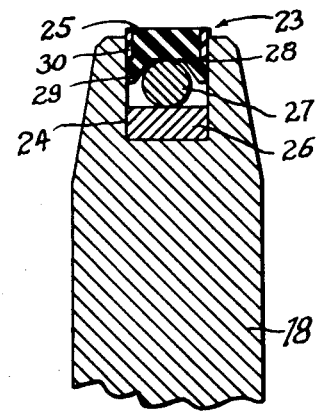
FIG. 2 is a partial, enlarged, transverse sectional view of a vane edge with the sealing assembly in place.

In accordance with the instant invention, longitudinally extending sealing assemblies 23 are located in longitudinal grooves 24 in the outer edge of vanes 18, as shown in FIG. 2; it being understood that similar sealing assemblies are on vanes 17. The vane grooves 24 are of rectangular cross section and assembly 23 comprises an outer, resilient sealing strip 25, an inner rigid metal strip 26 of rectangular cross section, and an intermediate rigid metal rod 27 of circular cross section.

The sealing strip 25 is formed of an oil resistant synthetic rubber or other suitable material; being of generally rectangular cross section and having a width to snugly fit into vane grooves 24. Strip 25 is formed on its under side with a longitudinal groove 28 of a section which provides opposed, longitudinally extending flanges 29 which taper to the lower edges thereof. The sides of strip 25 at the upper portion thereof may be reinforced with longitudinal, thin inserts 30 of Teflon or other suitable abrasion and oil resistant plastic.

The several elements making up seal assembly 23 are mounted in vane grooves 24, as follows. The strips 25 and 27 are located in said grooves, before or after the assembly of the rotor and stator members. Since the combined thickness of strips 25, 27 is less than the depth of grooves 24, the outer surface of strip 25 will be depressed below the edge 18a of vane 18. Thus, the outer surface of said strip 25 will not be abraded or otherwise disturbed as an incident to the location of the strip 25 in grooves 24.

With the stator and rotor members in assembled, coaxial relation, sealing strips 25 are brought into their operative positions. To this end, strip 26 is inserted endwise into groove 24 beneath rod 27 and moved longitudinally in the groove to its proper position within the groove. As a consequence, sealing strip 25 is moved radially outward of vane grooves 24 into contact with the opposed rotor surface 31 or the stator bore 32. As the combined thickness of the rod 27, strip 26 and sealing strip 25 in its uncompressed condition, is greater than the depth of vane grooves 24, it follows that sealing strip 25 will be under uniform radial compression throughout the length thereof, thereby effecting a tight seal in respect to the opposed rotor or stator surface portions.

Figure 3:
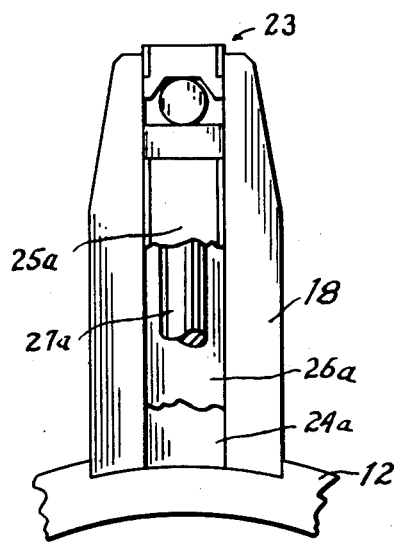
FIG. 3 is an end view of a vane showing the end sealing assembly in place.

By proper selection of the thickness dimensions of strips 25, 26 and rod 27, the extent of compression of strip 25 may be controlled. The ends of vanes 17, 18 may also be grooved to receive short seal assemblies 23 which will lie in opposed relation to end plates 13, 14. Thus as shown in FIG. 3, seal strip 25a, rod 27a and strip 26a will be located in vane groove 24a and strip 25a will be compressed when the end plates 13, 14 are bolted in place on stator 11.

It has been found that with seal assemblies 23, as described, and their manner of installation without abrasion or other disturbance of the outer surfaces of seal strips 25, a substantial increase in effectiveness of the seal between the high and low pressure chambers formed by vanes 17, 18, is attained and leakage is markedly reduced. In addition, breakaway torques are reduced.

Figure 4:
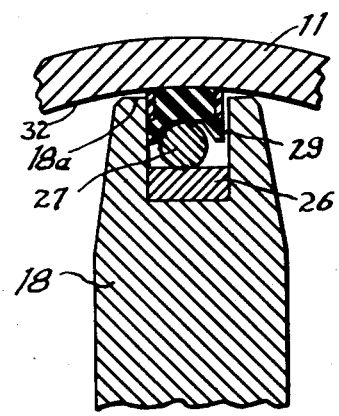
FIG. 4 is a transverse sectional view similar to that of FIG. 2, showing the seal assembly under conditions of use.

Apparently, the sealing efficiency of assemblies 23 may be attributed in part, to the tapered flange portions 29 on seal strips 25. Thus, as indicated in FIG. 4, assuming that the chamber to the right of vane 18 is the high pressure side and that to the left of said vane is the low pressure side; such pressure differential will deform seal strip 25 to provide a channel connecting the high pressure chamber with groove 24 and to admit hydraulic medium into said groove with a resultant pressure applied to the left hand tapered flange portion 29, urging said flange portion into intimate contact with the opposed wall surface of groove 24. In this manner, leakage by way of the vane grooves is substantially eliminated.

Figure 5:
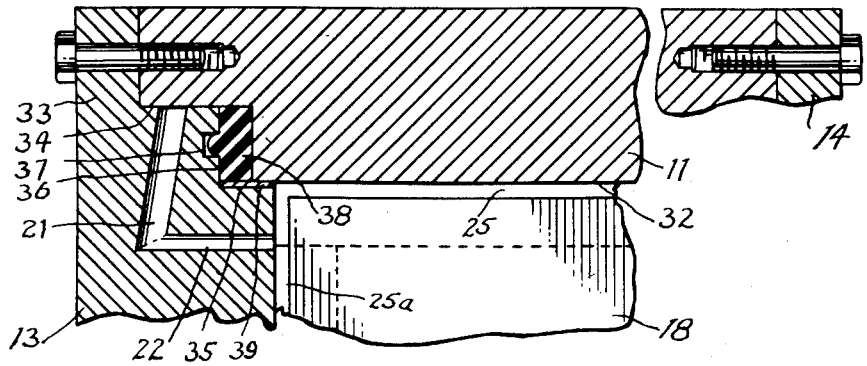
FIG. 5 is a partial longitudinal section showing an auxiliary seal assembly between the stator and end plates.
Figure 6:
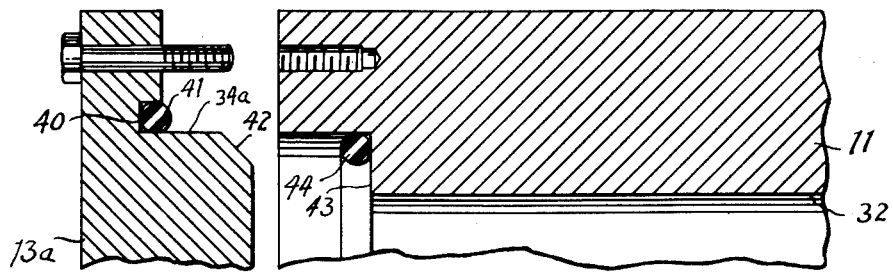
FIG. 6 is a partial longitudinal section showing a modified form of seal between the stator and end plates.
Figure 7:
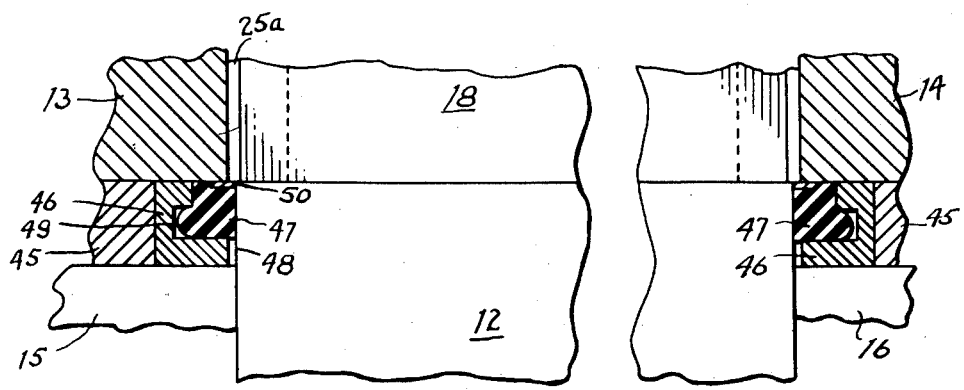
FIG. 7 is a partial longitudinal section showing a seal assembly between the rotor and end plates.

To further insure optimum sealing at the joints of the hydraulic actuator 10, improved seals are provided between the stator 11 and end plates 13, 14, as indicated in FIGS. 5, 6; and between the rotor 12 and said end plates, as indicated in FIG. 7.

Thus, as shown in FIG. 5, the bore 32 of stator 11 is slightly extended at its ends beyond the ends of rotor 12. The end plate 13 is formed with a bolting flange 33 and is stepped on its inner surface, as at 34, 35, forming an annular shoulder 36 which is provided with an annular groove 37 for the purpose hereinafter appearing.

An annular sealing ring 38 of normally rectangular cross section is mounted on step 35, said ring having a normal thickness slightly less than the depth of said step. On bolting end plate 13 in place on stator 11, the outer portion of step 35 will move into bore 32 to compress ring 38 between shoulder 36 and the opposed shouldered portion of said stator, to produce an effective seal at the joint between stator and end plate. Since compression of the resilient ring 38 results in the formation of a pinched or protuberant portion of said ring; groove 37 is adapted to receive said pinch or protuberance without shearing or otherwise impairing the ring 38.

Furthermore, while step 35 on end plate 13 may be turned to have a tight sliding fit with stator bore 32; preferably, said step is turned to have a loose fit and a coating of epoxy resin 39 is applied to the step. Coating 39 is sheared somewhat when end plate 13 is bolted in place, thus insuring a tight fit between the assembled parts. The same procedure is applicable to end plate 14.

Alternatively, as shown in FIG. 6, end plate 13a may be formed with a single step 34a having a communicating annular groove 40 for receiving a resilient sealing ring 41. Furthermore, the annular edge of step 34a is bevelled as at 42. Thus, when plate 13a is bolted in place on stator 11, stepped portion 34a is received in recess 43 on stator 11 and bevelled edge 42 abuts and compresses resilient sealing ring 44 in stator recess 43. Ring 44 is deformed on compression and may flow laterally within the recess by reason of the triangular shaped space defined by said recess and bevelled edge 42, avoiding pinching or shearing of said ring 44.

Leakage at the shaft ends 15, 16 of rotor 12 where the same pass through the bearing openings in end plates 13, 14, is materially reduced by the seal construction shown in FIG. 7. Thus, the usual bearing lining 45 is of reduced axial extent to provide an annular groove of rectangular cross section on the inner face of end plate 13. An L shaped annular ring 46 of bearing metal is located in said groove; said bearing metal ring 46 in turn supporting an annular resilient seal 47, also of L shaped section.

The resilient seal 47 is disposed in opposed relation to shoulder 48 of rotor shaft 15, the bearing metal ring 46 being spaced therefrom to allow for compression of seal 47 when end plate 13 is bolted in place. The bearing metal ring 46 is formed with an annular groove 49 to receive protuberant portions of resilient seal 47 under compression, thereby avoiding pinching or shearing of said seal.

Preferably, a split metal ring 50 is seated on resilient seal 47 to provide a smooth bearing surface for the lower ends of seal 25a on the vanes 18 of rotor 12. It is understood that shaft end 16 is similarly sealed, as indicated in FIG. 7. All resilient seals are formed of oil resistant, synthetic rubber.

It will be apparent that the vane and end plate seals described herein, taken singly or in combination, are effective to sharply reduce leakage of hydraulic medium under the high pressures encountered in hydraulic actuators, so as to substantially increase the operation efficiency of the device.

As various changes might be made in the embodiments of the invention herein shown and described without departing from the spirit thereof, it is understood that all matter herein shown or described shall be deemed illustrative and not limiting except as set forth in the appended claims.

Having thus described my invention, I claim as new and desire to protect by Letters Patent:

1. In a hydraulic actuator including coaxially related stator and rotor members and end plates on opposite ends of said stator member, said rotor including shaft end portions of reduced diameter forming annular shoulders therebetween, said end plates being formed with bearing openings for passing said shaft end portions on said rotor member, sealing means for sealing the joint between said end plates and said shaft end portions comprising a bearing metal sleeve in the bearing openings of said end plates and fixed to said end plates, said bearing metal sleeve terminating at the inner end thereof short of the inner face of said end plates to expose an inner end portion of the bearing opening in said end plates and to provide an annular recess between the exposed inner end portion of the bearing opening in said end plates, the terminal end of said bearing metal sleeve and the inner end of said shaft end portion, a bearing metal ring of L-shape in cross-section located in said annular recess, said ring including one arm in bearing relation to the inner end of said shaft end portion and the other arm abutting the terminal end of said bearing sleeve, and an annular resilient seal member seated in said bearing metal ring between the arms thereof and having portions thereof abutting a shoulder portion of said shaft end and the exposed inner end portion of the bearing opening in said end plate.

2. In a device as in claim 1 wherein said metal ring is formed with an annular groove to receive displaced portions of the inner face portions of said resilient seal.

3. In a device as in claim 2 wherein said resilient seal is formed on its periphery with an annular recess to seat a thin metal ring extending between the bearing opening of said end plate and said shoulder of the rotor member.

References Cited in the file of this patent

UNITED STATES PATENTS

| | | |
|---|---|---|
| 996,446 | Anderson | June 27, 1911 |
| 2,285,870 | Parker | June 9, 1942 |
| 2,614,006 | Beckman | Oct. 14, 1952 |
| 2,710,581 | Rosaen | June 14, 1955 |
| 2,954,012 | Curtis et al. | Sept. 27, 1960 |

FOREIGN PATENTS

| 9,862 | Great Britain | 1891 |
|---|---|---|